(12) United States Patent
Gatzke et al.

(10) Patent No.: US 9,183,834 B2
(45) Date of Patent: Nov. 10, 2015

(54) SPEECH RECOGNITION TUNING TOOL

(75) Inventors: Alan D. Gatzke, Bainbridge Island, WA (US); Michael T. Maas, Shoreline, WA (US); Ryan L. Bloom, Seattle, WA (US); Jeff B. Lindborg, Seattle, WA (US)

(73) Assignee: Cisco Technology, Inc., San Jose, CA (US)

(*) Notice: Subject to any disclaimer, the term of this patent is extended or adjusted under 35 U.S.C. 154(b) by 1254 days.

(21) Appl. No.: 12/507,126

(22) Filed: Jul. 22, 2009

(65) Prior Publication Data

US 2011/0022386 A1 Jan. 27, 2011

(51) Int. Cl.
*G10L 15/00* (2013.01)
*G10L 15/26* (2006.01)
*G10L 15/06* (2013.01)
*H04M 3/493* (2006.01)
*H04M 3/533* (2006.01)

(52) U.S. Cl.
CPC ............... *G10L 15/265* (2013.01); *G10L 15/06* (2013.01); *G10L 2015/0631* (2013.01); *H04M 3/493* (2013.01); *H04M 3/533* (2013.01); *H04M 2201/40* (2013.01)

(58) Field of Classification Search
CPC ....... G10L 15/265; G10L 15/22; G10L 15/00; G10L 15/26; G10L 17/24
USPC ............ 704/235, E15.001, E15.043, E17.016
See application file for complete search history.

(56) References Cited

U.S. PATENT DOCUMENTS

| | | | |
|---|---|---|---|
| 6,272,464 B1* | 8/2001 | Kiraz et al. | 704/257 |
| 6,389,394 B1* | 5/2002 | Fanty | 704/249 |
| 6,397,182 B1* | 5/2002 | Cruickshank et al. | 704/256.1 |
| 6,434,521 B1* | 8/2002 | Barnard | 704/244 |
| 6,839,667 B2* | 1/2005 | Reich | 704/240 |
| 6,940,954 B1 | 9/2005 | Toebes | |
| 6,978,238 B2* | 12/2005 | Wohlsen et al. | 704/246 |
| 7,277,851 B1* | 10/2007 | Henton | 704/235 |
| 7,580,840 B1* | 8/2009 | Bhasin et al. | 704/270.1 |
| 7,624,016 B2* | 11/2009 | Ju et al. | 704/270 |
| 7,809,567 B2* | 10/2010 | Ju et al. | 704/257 |
| 7,826,945 B2* | 11/2010 | Zhang et al. | 701/36 |
| 8,121,838 B2* | 2/2012 | Kobal et al. | 704/235 |
| 2002/0169613 A1* | 11/2002 | Damiba | 704/270.1 |
| 2002/0196911 A1* | 12/2002 | Gao et al. | 379/88.03 |
| 2003/0117365 A1* | 6/2003 | Shteyn | 345/156 |
| 2003/0139925 A1* | 7/2003 | Anderson et al. | 704/231 |

(Continued)

OTHER PUBLICATIONS

Beaufays et al. "Learning Name Pronunciations in Automatic Speech Recognition Systems" 2003.*

(Continued)

*Primary Examiner* — Shaun Roberts
(74) *Attorney, Agent, or Firm* — Edell, Shapiro & Finnan, LLC

(57) ABSTRACT

Systems and methods for tuning a dictionary of a speech recognition system includes accessing a voice mail record of a user, accessing a recorded audio file of a name of the user in the voice mail record spoken by the user, providing the audio file to a speech recognition system, processing the audio file in the speech recognition system and obtaining a text result, determining whether a confidence score of the text result is below a predetermined threshold, and adding, at least, the name of the user to a list of low confidence names. Alternate spellings for the low confidence names can then be added to the dictionary.

17 Claims, 5 Drawing Sheets

(56) References Cited

U.S. PATENT DOCUMENTS

| | | | |
|---|---|---|---|
| 2004/0098263 A1* | 5/2004 | Hwang et al. | 704/266 |
| 2005/0049860 A1* | 3/2005 | Junqua et al. | 704/231 |
| 2005/0203751 A1* | 9/2005 | Stevens et al. | 704/276 |
| 2005/0289463 A1* | 12/2005 | Wu et al. | 715/533 |
| 2006/0004572 A1* | 1/2006 | Ju et al. | 704/243 |
| 2006/0116885 A1* | 6/2006 | Shostak | 704/273 |
| 2006/0129398 A1* | 6/2006 | Wang et al. | 704/251 |
| 2006/0256942 A1* | 11/2006 | Gatzke et al. | 379/142.01 |
| 2006/0293886 A1* | 12/2006 | Odell et al. | 704/231 |
| 2006/0293889 A1* | 12/2006 | Kiss et al. | 704/235 |
| 2007/0005206 A1* | 1/2007 | Zhang et al. | 701/36 |
| 2007/0239455 A1* | 10/2007 | Groble et al. | 704/260 |
| 2007/0265850 A1* | 11/2007 | Kennewick et al. | 704/257 |
| 2008/0010058 A1* | 1/2008 | Weng et al. | 704/9 |
| 2008/0052076 A1* | 2/2008 | Metz | 704/257 |
| 2008/0077409 A1* | 3/2008 | Sannerud | 704/277 |
| 2008/0273672 A1* | 11/2008 | Didcock et al. | 379/88.01 |
| 2009/0043576 A1* | 2/2009 | Miller et al. | 704/231 |
| 2009/0043587 A1* | 2/2009 | Shostak | 704/275 |
| 2009/0216525 A1* | 8/2009 | Shostak | 704/9 |
| 2009/0248395 A1* | 10/2009 | Alewine et al. | 704/7 |
| 2009/0248415 A1* | 10/2009 | Jablokov et al. | 704/251 |
| 2009/0276215 A1* | 11/2009 | Hager | 704/235 |
| 2009/0287484 A1* | 11/2009 | Bushey et al. | 704/231 |
| 2010/0161337 A1* | 6/2010 | Pulz et al. | 704/257 |
| 2010/0177877 A1* | 7/2010 | Hamaker et al. | 379/88.14 |
| 2010/0250240 A1* | 9/2010 | Shu | 704/10 |
| 2011/0022387 A1* | 1/2011 | Hager | 704/235 |

OTHER PUBLICATIONS

Spiegel et al. "Proper Name Pronunciations for Speech Technology Applications" 2003.*
"Speech Connect for Cisco Unity Product Overview" 2008.*
Yu et al. "Improved Name Recognition With User Modeling" 2003.*
"Installation and Administration Guide for the Speech Connect for Cisco Unity Feature" May 2009.*
Davel et al. "Dictionarymaker User Manual Version 2.0(I)" 2006.*
"User Guide for the Cisco Unity Connection Assistant Web Tool", Release 7.x; Cisco Systems, Inc., Aug. 25, 2008; pp. 1-72.

* cited by examiner john qault as Interpretation(1/2): john coe Confidence: 2   jqualt.wav
john qault as Interpretation(2/2): john crow Confidence: 1 jqualt.wav

*Fig. 3*

SPEECH RECOGNITION TUNING TOOL

TECHNICAL FIELD

The present disclosure relates to speech recognition systems. More particularly, the present disclosure relates to automated tools that help to tune a speech recognition system.

BACKGROUND

Many automated attendants, interactive voice response (IVR) systems, name dialers and voicemail systems use speech recognition as an alternative to dual tone multiple frequency (DTMF) menu navigation. More specifically, speech recognition technology allows a caller to speak, e.g., voice commands and/or a person's name rather than pressing DTMF keys on a telephone to select commands and "spell" a person's name. Such technology is especially useful for identifying users since spelling a person's name using DTMF keys can be quite difficult. That is, not only is it time consuming to find the correct letters that are grouped on individual keys on the DTMF keypad, but often times the caller might not even know how to spell the person's name. Moreover, in some situations, it may be dangerous to force a caller to enter a person's name via the keypad. For instance, the caller may be using a mobile telephone while driving, and it would be unsafe for the driver to pay attention to dialing/pressing keys. Thus, there has been a trend to increasingly rely on speech recognition system technology over DTMF approaches.

Unfortunately, it is not uncommon for speech recognition systems to do a relatively poor job of accurately recognizing, in particular, some peoples' names. When a caller speaks a person's name or any other speech, the speech recognition system records the sound, attempts to phonetically break the sound down into, for example, syllables or other phonetic segments and then match appropriate spellings to the syllables or segments, thus resulting in a text string. That text string, however, may, in fact, have very little resemblance to the actual spelling of the intended person's name.

BRIEF DESCRIPTION OF THE DRAWINGS

FIG. 3 shows example output of the method depicted in FIG. 2;

DESCRIPTION OF EXAMPLE EMBODIMENTS

Overview

Broadly, embodiments provide methods, logic, and systems that aid an administrator to maintain or tune a speech recognition system. One method includes accessing a voice mail record of a user, accessing a recorded audio file of a name of the user in the voice mail record spoken by the user, providing the audio file to a speech recognition system, processing the audio file in the speech recognition system and obtaining a text result, determining whether a confidence score of the text result is below a predetermined threshold, and adding, at least, the name of the user to a list of low confidence names.

Once the list has been generated, an administrator can then listen to each name as recorded within the voice mail system (or other repository where such recordings might be available) and enter into the speech recognition system alternate spellings for the respective names. In this way, the speech recognition system can be tuned to provide improved results for specific peoples' names. Moreover, the tuning may also provide more generally applicable tuning information for the speech recognition system.

EXAMPLE EMBODIMENTS

Figure 1:
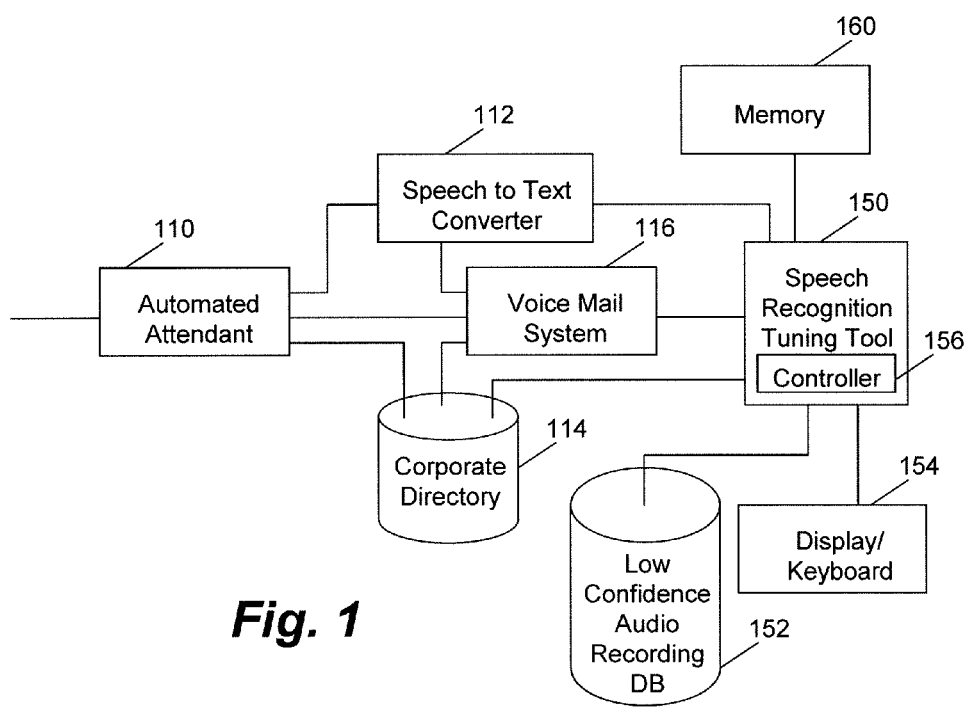
FIG. 1 is a block diagram of an IVR system in combination with a speech recognition tuning tool.

FIG. 1 is a block diagram of an IVR system in combination with a speech recognition tuning tool in accordance with a described embodiment. The IVR system may be comprised of an automated attendant 110, a speech to text converter 112, voice mail system 116 and corporate directory 114, among other possible elements.

The telephone automated attendant 110 comprises a call processing system for answering telephone calls and for helping to direct a caller to a requested party. Such systems typically enable a telephone caller to dial into the system and be presented with an audible menu of options. Each option may correspond to a particular dual tone multiple frequency (DTMF) digit, thereby enabling the caller to select a desired option by pressing one of the touch tone keys on his/her telephone. In accordance with described embodiments, automated attendant 110 is also configured to handle voice commands and other speech from a caller.

More specifically, a caller may issue a voice command including, e.g., a request for information, a request to leave a message, or, of particular interest in the instant context, a request to be connected to a particular named person, e.g., an employee, registered user, etc. The voice command from the caller is directed to the speech to text converter 112, which is configured to receive a recorded file, e.g., a .WAV file, of the voice command from the automated attendant 110. Alternatively, the speech to text converter 112 may be connected directly or in parallel with automated attendant 110 and make its own a recording of the spoken name.

The recorded file is processed by the speech to text converter 112 such that a text string is output that can then be further processed as appropriate. For a spoken name, e.g., "Alan Gatzke," in the best of circumstances, the speech to text converter 112 will output a spelling identical to the person's name. That text version of the user's name can then be used to make a query to, e.g., corporate directory 114, which may store names, telephone numbers, office locations, etc., associated with the registered users.

Where the text version of the name is found in the corporate directory, the automated attendant 110 may attempt to connect the caller with the desired person, i.e., transfer the caller to the identified person. That person may pick up the telephone and answer the call. If the person does not answer the call, the call may be further transferred to voice mail system 116. Voice mail systems typically play a recorded message, from, e.g., a stored .WAV file, such as: "Alan Gatzke is unavailable. Please leave a message after the tone." Many voice mail systems require users to also record their names separately from other messages so that the audio of a person's name can be used in default messages, or for other purposes. For example, some voice mail systems are configured to voice a standard message, and use only the audio of the person's name, as in: "The person at extension 1212, [audio of person's name is inserted], is not available. Please leave a message after the tone." Such systems enable administrators to better control/standardize the types of messages that can be played for callers.

A user's separately recorded name can also be used, if stored more generally in corporate directory 114, for teleconferencing announcements, among other uses.

As will be explained in more detail later herein, it may be particularly convenient to have access to the separately recorded name of a person.

As noted earlier, it is not uncommon for speech recognition systems to do a relatively poor job of accurately recognizing and converting some peoples' names to text. This may be due to the complexity of the name, the speaker's accent, background noise, or simple mispronunciation of the person's name. In any event, when a caller speaks a person's name, the speech recognition system attempts to phonetically break the sound into, e.g., syllables or segments, and then match appropriate spellings to those syllables or segments, resulting in the desired text string. That resulting text string, however, may have very little resemblance to the actual spelling of the intended person's name.

In response to the foregoing, embodiments described herein help to "tune" the speech to text converter of the speech recognition system (or a library thereof) so that when a name is spoken, an appropriate text string, i.e., one that can be matched with the person's actual name, is output.

To achieve improved tuning, and still with reference to FIG. 1, there is provided a speech recognition tuning tool 150 that may be in communication with several components and systems as shown. That is, speech recognition tuning tool 150 is in communication with speech to text converter 112, voice mail system 116, corporate directory 114, as well as to a low confidence audio recording database 152, and input/output devices such as display/keyboard 154.

In an embodiment, speech recognition tuning tool 150 includes a controller 156 that is in communication with memory 160, which may be in the form of random access memory (RAM), read only memory (ROM), magnetic memory, or any other form of tangible memory with which process logic, as will be explained in detail herein, can be stored and retrieved by controller 156, and speech recognition tuning tool 150, generally. Further, the functionality described below may be carried out by controller 156 upon execution of process logic stored in memory 160, controller 156 or speech recognition tuning tool 150. Controller 156 is, for example, a data processor, e.g., a microprocessor or microcontroller, that executes the process logic. In another form, the controller 156 is implemented by digital logic gates, a programmable gate array device or other programmable or fixed logic device, and which logic is configured to perform the process logic.

Thus, in an embodiment, speech recognition tuning tool 150 could be part of computer device, such as a laptop computer. Alternatively, speech recognition tuning tool 150 may provided as an administrator utility for an overall automated attendant system, such as Cisco Unity Connection available from Cisco, San Jose, Calif. In the latter instance, the functionality provided by the speech recognition tuning tool 150 may be encoded on, e.g., a CD-ROM, or downloaded over a network connection to a computer from which the speech recognition tuning tool 150 can be operated.

Because many people tend to avoid adding their own alternate spellings to speech recognition systems to counter the sometimes poor performance of speech to text converters, this responsibility often falls to system administrators. While system administrators can add alternate spellings to the system, it is extremely time consuming to do so, especially for systems that have thousands of users. In any event, an administrator may not even know that some peoples' names are not being handled well by the speech to text converter 112.

The speech recognition tuning tool 150 aids an administrator or other authorized user to identify the names of the users with which the speech to text converter 150 has difficulty. That set of names is typically a much smaller subset of the total number of user names in the system making it much more manageable for the administrator to only enter alternate spellings for those specific users.

In order to obtain a list of names for which the speech to text converter 112 is having difficulty, the speech recognition tuning tool 150 accesses user names from the voice mail system 116. More specifically, the tool retrieves the audio file for each name and sends the audio file to the speech to text converter 112. Preferably, the audio file is one that includes only a person's names. If not, then the name of the user may first have to be isolated. Segmenting, isolating or selecting specific words or phrases (in this case, someone's name) from an audio file are known and will not be described herein.

When the speech recognition tuning tool 150 receives the results back from the speech to text converter 112 it checks the "confidence score" for that result. The score may be presented as a number scale, a percentage, or any other scheme that can rate how "well" the speech to text converter 112 performed for a given audio input. If the confidence score falls below a configurable and predetermined threshold, then that name is added to a list of low confidence names, stored in, e.g., low confidence audio recording database 152.

The foregoing is described in more detail with reference to FIG. 2, which shows a flow chart of a method for identifying names of users with which a speech recognition system has difficulty interpreting. The method begins at step 202 at which the voice mail record of a given user is accessed. As indicated in step 204, the recorded audio of the name of the user is then accessed. Preferably, the person's name is a separate audio file. At step 206, the recorded audio of the person's name is provided to a speech recognition system, such as speech to text converter 112. A confidence score for the output of the speech recognition system is then checked at step 208. Decision step 210 determines whether the confidence score is below some predetermined threshold typically set by an administrator. If yes, then at step 212, the name of the person is added to a list of low confidence names and the process moves to step 214. In other words, if the speech recognition system itself determines that its own output text string is of questionable reliability, then that is a cue to add that name to the list of low confidence names. If the confidence score is above the threshold at step 210, then it is determined at step 214 whether there are more users/voice mail name audio files to process. If yes, the method returns to step 202. Otherwise, this aspect of the process, i.e., identifying potentially difficult names, is complete.

Figure 2:
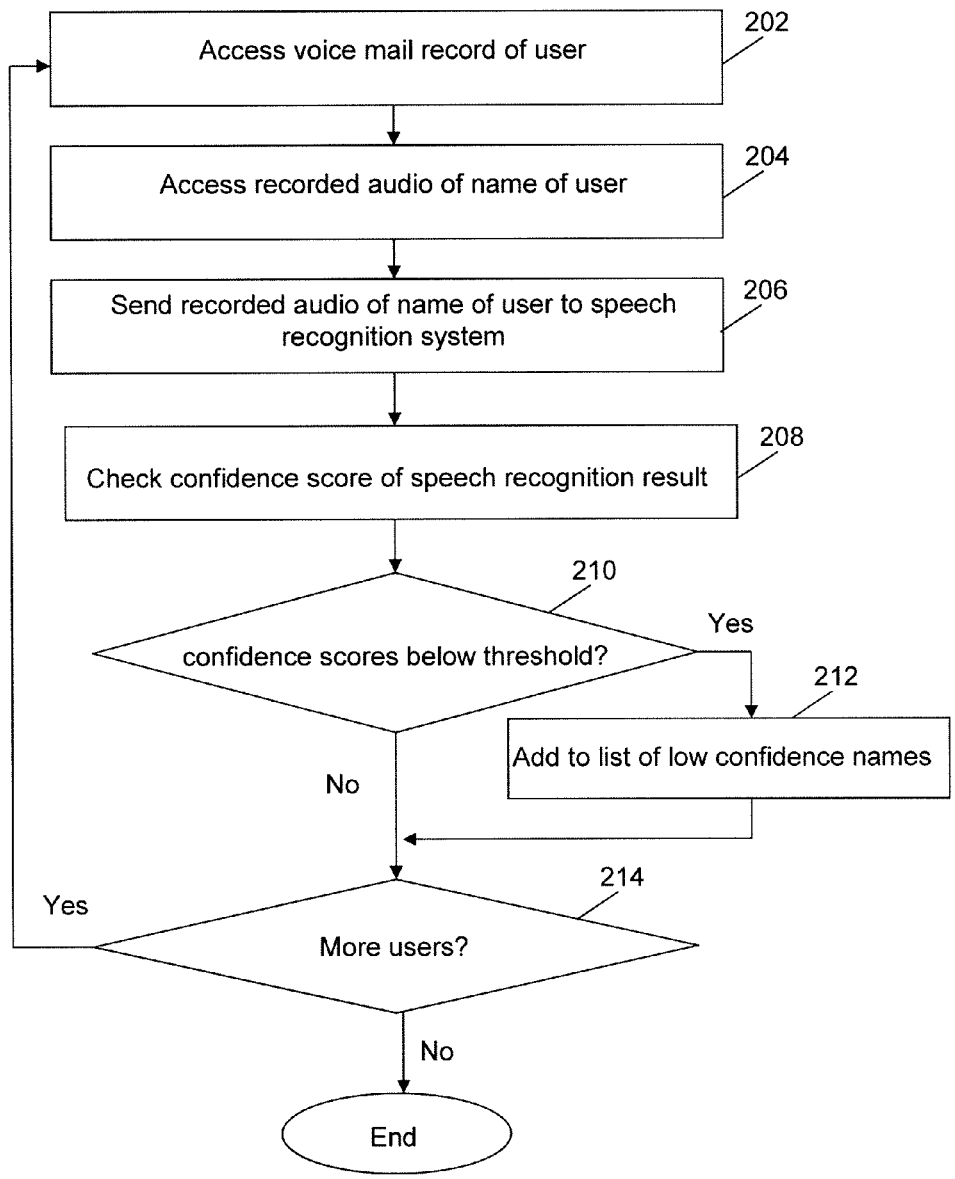
FIG. 2 is a flow chart showing a method of identifying names of users with which a speech recognition system has difficulty interpreting.

FIG. 3 is an example output of the method depicted in FIG. 2 for a single name. This output, for a plurality of names can be referred to as an "n-best list." The confidence score for the name of "John Qualt" is relatively low, a one or two, for two different possible interpretations. Both of these confidence scores cause the name "John Qualt" to be listed in the low confidence audio recording database 152.

Once the speech recognition tuning tool 150 has iterated through the list of all of the recorded names from the voice mail system 116, the administrator can manually enter alternate spellings for each of the identified low confidence names. Specifically, the administrator can use the tool to successively play the recorded names in the "low confidence"

list, and after listening to each recorded name, enter appropriate alternate spellings for that name. The list of "low confidence names" is likely to be a much smaller subset of the entire list of recorded names in any given system. After the list of alternate spellings has been created by the administrator, the tool 150 adds those names back into the speech to text converter 112 or associated dictionary or library of the speech recognition system. With the names dictionary so updated, the speech to text converter 112 should have much better results when people speak those names.

Figure 4:
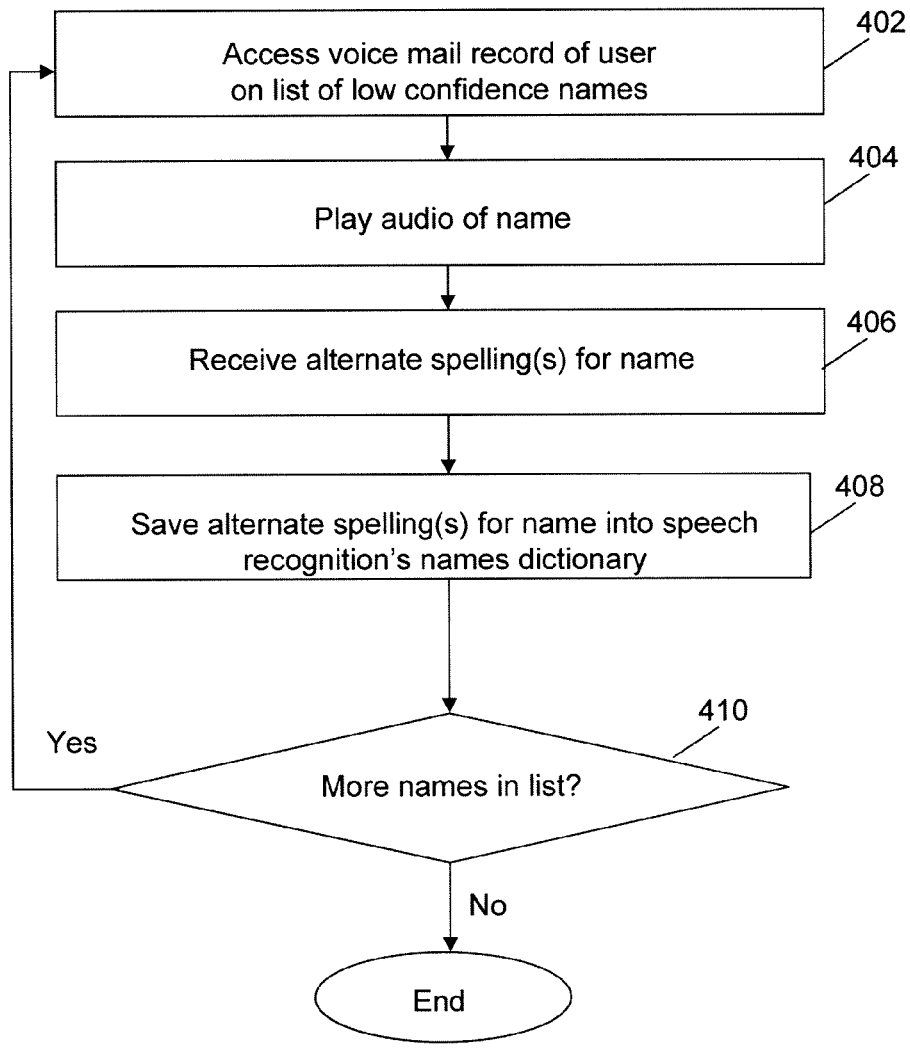
FIG. 4 is a flow chart showing a method of updating a speech recognition system with alternate names.

FIG. 4 is a flow chart showing more formally a method for updating a speech recognition system with alternate names. Essentially, FIG. 4 is a continuation of the method depicted in FIG. 2. Specifically, after generating a list of low confidence names and storing the same in the low confidence audio recording database 152 consistent with the method steps of FIG. 2, the tool 152 enables an administrator to easily add alternate spellings for those names. At step 402, the tool 152 enables the administrator to access the voice mail record of persons on the list of low confidence names. The tool 152 can allow access via the voicemail system 116 itself, or, alternatively, the audio file may have been stored (either actually or a path or link thereto) along with the name, as shown in FIG. 3. In a preferred embodiment, the administrator need simply "click" on a given name or associated .WAV file, and the audio of the person's name will be played for the administrator to hear, as indicated by step 404.

Once heard, and at step 406, the tool 150 is configured to receive alternate spellings via a keyboard, touch display 154, etc. These alternate spellings are then saved in the dictionary of the speech recognition system at step 408, and then, at step 410 it is determined whether there are more names in the list of low confidence names to analyze and for which to create alternate spellings.

Figure 5:
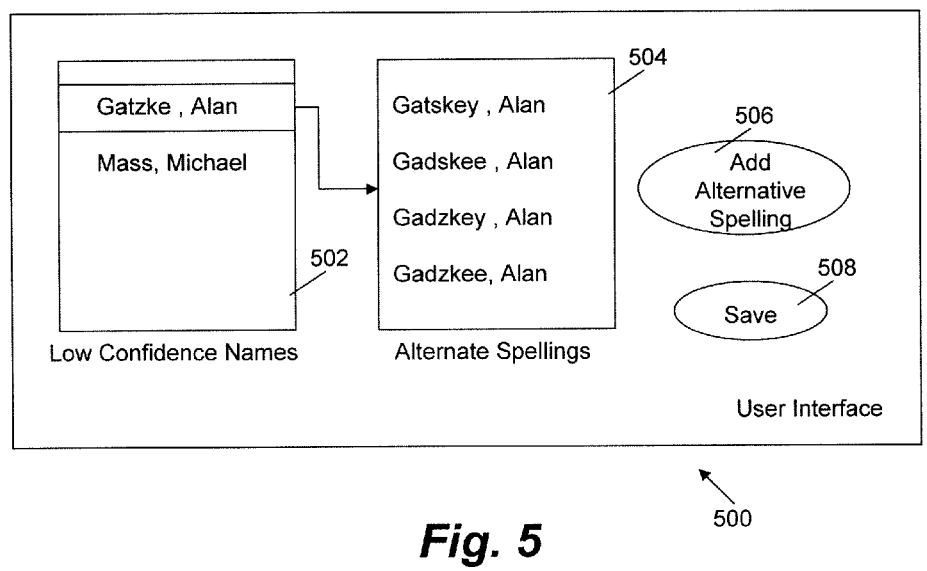
FIG. 5 is an example user interface for updating a speech recognition system with alternate names.

FIG. 5 is an example user interface for updating a speech recognition system with alternate names. As shown, a list of low confidence names is provided in field 502. These names can preferably be selected by a pointing device such as a mouse. Upon selection of a given name, any alternate spellings for that name are preferably shown in field 504. In this embodiment, to add yet another alternative spelling the user need simply click the "Add Alternative Spelling" button and a new, clear line may be provided below the already-present alternate spellings. Any of these alternative spellings can also, of course, be deleted or modified as desired.

Although the recorded voice names will more than likely be retrieved from a voice mail system, speech recognition tuning tool 150 could also retrieve the recorded names from other sources such as a conferencing server, IVR system, etc. Any speech application (IVR, automated attendant, name dialer, etc.) using the "tuned" speech to text converter can, accordingly, benefit from the improved names dictionary.

In a preferred use, the speech recognition tuning tool 150 is used periodically for maintenance purposes. More specifically, large enterprises, with hundreds or even thousands of employees, may experience employee turnover over time. By periodically (e.g., weekly, monthly, etc.), running the tool 150, it is possible to capture peoples' names for which it may be desirable to tune the dictionary. In an embodiment, the tool 150 is run when a number of new employees reaches a predetermined threshold.

Embodiments described herein can greatly reduce the number of names that an administrator must analyze. Embodiments may also identify some names that one might not normally consider to be problematic. Thus, embodiments may identify names prior to users complaining that calls intended for them are not being properly routed.

Furthermore, the tuning employed to improve name recognition, can also be applied generally by the speech recognition system and thus improve the overall performance of the system.

Although the apparatus, logic, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method, comprising:
   accessing a voice mail record of a user within a voice mail system;
   accessing a recorded audio file of a name of the user in the voice mail record spoken by the user;
   providing the audio file to a speech recognition system that is operable with an automated attendant;
   processing the audio file in the speech recognition system and obtaining a text result;
   determining whether a confidence score of the text result is below a predetermined threshold;
   adding, at least, the name of the user to a list of low confidence names when the confidence score is below the predetermined threshold;
   when the name of the user is listed in the list of low confidence names, storing a plurality of actual alternate spellings for the name of the user, wherein the plurality of actual alternate spellings are accessible to the speech recognition system and are received via a user interface configured to be presented to an administrator of the automated attendant;
   receiving a voice call at the automated attendant including receiving a voice command comprising a spoken name of the user; and
   processing the spoken name of the user including comparing a spelled name result generated by the speech recognition system to the plurality of actual alternate spellings previously stored to identify the user.

2. The method of claim 1, further comprising obtaining a plurality of text results for each name in list of low confidence names.

3. The method of claim 2, further comprising obtaining an n-best list of low confidence names.

4. The method of claim 1, further comprising adding a link to the audio file in the list of low confidence names.

5. The method of claim 1, further comprising listing the confidence score along with the name of the user in the list of low confidence names.

6. The method of claim 1, further comprising repeating the method when a number of new users reaches a predetermined threshold.

7. The method of claim 1, further comprising receiving a request to play the audio file, the request having been initiated from the list of low confidence names.

8. The method of claim 1, wherein storing is initiated from an administrator's user interface.

9. The method of claim 1, further comprising configuring the predetermined threshold.

10. The method of claim 1, further comprising repeating the method for each name in a directory of names.

11. An apparatus, comprising:
a speech recognition tuning tool configured to be in communication with a voice mail system, a low confidence audio recording database, and a speech to text converter, the speech recognition tuning tool having a controller, wherein the controller is configured to:
- access an audio file of a name of the user in the voice mail system;
- provide the audio file to the speech to text converter operable with an automated attendant;
- determine whether a confidence score of a text result from the speech to text converter is below a predetermined threshold;
- add, at least, the name of the user to a list of low confidence names in the low confidence audio recording database when the confidence score is below the predetermined threshold;
- receive, via a user interface configured to be presented, via a display, to an administrator of the automated attendant, and store a plurality of actual alternate spellings for the name of the user, wherein the plurality of actual alternate spellings are accessible to the controller;
- receive a voice call at the automated attendant including receiving a voice command comprising a spoken name of the user; and
- process the spoken name of the user including comparing a spelled name result generated by the speech to text converter to the plurality of actual alternate spellings previously stored to identify the user.

12. The apparatus of claim 11, wherein the controller is configured to save the alternate spellings in a dictionary.

13. The apparatus of claim 11, wherein the controller is configured to present to a user a link or path to the audio file.

14. The apparatus of claim 11, wherein the controller is configured to cause the audio file to be played.

15. Logic encoded in one or more non-transitory media for execution and when executed operable to:
- access an audio file of a name of the user in a voice mail system;
- provide the audio file to a speech to text converter operable with an automated attendant;
- determine whether a confidence score of a text result from the speech to text converter is below a predetermined threshold;
- add, at least, the name of the user to a list of low confidence names when the confidence score is below the predetermined threshold;
- receive, via a user interface configured to be presented to an administrator of the automated attendant, and store a plurality of actual alternate spellings for the name of the user as a result of the name having been added to the list of low confidence names;
- receive a voice call at the automated attendant including receiving a voice command comprising a spoken name of the user; and
- process the spoken name of the user including comparing a spelled name result generated by the speech to text converter to the plurality of actual alternate spellings previously stored to identify the user.

16. The logic of claim 15, wherein the logic is further operable to save the alternate spellings in a dictionary.

17. The logic of claim 15, wherein the logic is further operable to present to a user a link or path to the audio file along with the name in the list of low confidence names.

* * * * *